United States Patent
McNicol et al.

(10) Patent No.: US 10,404,378 B2
(45) Date of Patent: Sep. 3, 2019

(54) OPTICAL COMMUNICATION SYSTEM

(71) Applicant: Infinera Corporation, Annapolis Junction, MD (US)

(72) Inventors: John D. McNicol, Ottawa (CA); Kuang-Tsan Wu, Kanata (CA)

(73) Assignee: Infinera Corporation, Sunnyvale, CA (US)

( * ) Notice: Subject to any disclaimer, the term of this patent is extended or adjusted under 35 U.S.C. 154(b) by 31 days.

(21) Appl. No.: 15/467,452

(22) Filed: Mar. 23, 2017

(65) Prior Publication Data

US 2017/0195056 A1    Jul. 6, 2017

Related U.S. Application Data

(62) Division of application No. 13/082,378, filed on Apr. 7, 2011, now Pat. No. 9,621,274.

(60) Provisional application No. 61/322,145, filed on Apr. 8, 2010.

(51) Int. Cl.
*H04B 10/50* (2013.01)
*H04B 10/556* (2013.01)

(52) U.S. Cl.
CPC ..... *H04B 10/5055* (2013.01); *H04B 10/5561* (2013.01)

(58) Field of Classification Search
None
See application file for complete search history.

(56) References Cited

U.S. PATENT DOCUMENTS

| | | | |
|---|---|---|---|
| 5,485,489 A | 1/1996 | Chiba | |
| 5,991,308 A | 11/1999 | Fuhrmann et al. | |
| 7,032,139 B1 * | 4/2006 | Iryami | H04L 1/242 398/16 |
| 7,606,498 B1 | 10/2009 | Wu et al. | |
| 2003/0007576 A1 | 1/2003 | Alavi et al. | |
| 2008/0205900 A1 * | 8/2008 | Cole | H04J 14/0289 398/153 |
| 2009/0047028 A1 * | 2/2009 | Terahara | H04B 10/505 398/188 |
| 2009/0201796 A1 | 8/2009 | Roberts et al. | |
| 2010/0067902 A1 | 3/2010 | Sun et al. | |

(Continued)

FOREIGN PATENT DOCUMENTS

EP    1791346 A1 *    5/2007    ......... H04N 21/222

*Primary Examiner* — Kenneth N Vanderpuye
*Assistant Examiner* — David W Lambert
(74) *Attorney, Agent, or Firm* — David L. Soltz

(57) ABSTRACT

A transmitter is provided that transmits data in either a "quasi-DP-BPSK" ("QDP") mode or in a DP-QPSK mode. In the QDP mode, data bits are transmitted as changes in phase between first and second phase states along a first axis or as changes in phase between third and fourth phase states along a second axis in the IQ plane. A sequence bit identifies which axis carries the data bit. The sequence bit is one of a series of sequence bits that may be generated by a pseudo-random number generator. The series of sequence bits can be relatively long to permit sufficiently random changes in the axis that carries the data. Thus, unlike conventional BPSK, in which data is transmitted between phase states along a single axis, the present disclosure provides an apparatus and related method for randomly selecting one of two axes, for example, for each transmitted bit.

8 Claims, 9 Drawing Sheets

(56) References Cited

U.S. PATENT DOCUMENTS

2010/0172655 A1* 7/2010 Zhang ............... H04B 10/5055
                                                    398/187
2011/0150505 A1   6/2011 Roberts et al.

* cited by examiner

| s(k-1) | s(k) | d(k) | i(k-1) | i(k) | q(k-1) |
|---|---|---|---|---|---|
| 0 | 0 | 0 | 0 | 0 | 0 |
| 0 | 0 | 0 | 1 | 1 | 1 |
| 0 | 0 | 1 | 0 | 1 | 0 |
| 0 | 0 | 1 | 1 | 0 | 1 |
| 0 | 1 | 0 | 0 | 1 | 0 |
| 0 | 1 | 0 | 1 | 0 | 1 |
| 0 | 1 | 1 | 0 | 0 | 0 |
| 0 | 1 | 1 | 1 | 1 | 1 |
| 1 | 0 | 0 | 0 | 0 | 1 |
| 1 | 0 | 0 | 1 | 1 | 0 |
| 1 | 0 | 1 | 0 | 1 | 1 |
| 1 | 0 | 1 | 1 | 0 | 0 |
| 1 | 1 | 0 | 0 | 0 | 1 |
| 1 | 1 | 0 | 1 | 1 | 0 |
| 1 | 1 | 1 | 0 | 1 | 1 |
| 1 | 1 | 1 | 1 | 0 | 0 |

OPTICAL COMMUNICATION SYSTEM

INCORPORATION BY REFERENCE

The present application is a divisional patent application of U.S. Ser. No. 13/082,378, filed on Apr. 7, 2011; which claims the benefit of U.S. Provisional Application No. 61/322,145, filed Apr. 8, 2010, the entire contents of both of which are incorporated herein by reference.

BACKGROUND

Wavelength division multiplexed (WDM) optical communication systems are known in which multiple optical signals or channels, each having a different wavelength, are combined onto an optical fiber. Such systems typically include a laser associated with each wavelength, a modulator configured to modulate the optical signal output from the laser, and an optical combiner to combine each of the modulated optical signals. Such components are typically provided at a transmit end of the WDM optical communication system to transmit the optical signals onto the optical fiber. At a receive end of the WDM optical communication system, the optical signals are often separated and converted to corresponding electrical signals that are then processed further.

In earlier systems, the modulators would often intensity or amplitude modulate one polarization of an optical signal in accordance with a known on-off keying format. Using "direct detection" at the receive end, transmitted data or information is sensed as changes in the light intensity of the optical signal. In later systems, optical signals having the same wavelength but different polarizations (e.g., transverse electrical or TE and transverse magnetic or TM) have been separately modulated and combined multiplexed on to an optical fiber. Such polarization multiplexed optical signals at different wavelengths can be supplied to the optical fiber in order to further increase capacity.

In addition to direct detection systems, optical systems have been deployed that implement coherent detection, in which the optical phase of a transmitted optical signal is modulated in order to carry data. Coherent detection systems are known to have a greater noise tolerance than direct detection-based systems.

A receiver in a coherent system typically includes a light source or laser, also referred to as a local oscillator. Incoming light of the received optical signal, which, if polarization multiplexed, may be split by a polarization beam splitter (PBS) into two orthogonal signals, having the TE and TM polarizations, respectively. Each signal output from the PBS may be combined with the light output from the local oscillator and may be passed through a 90-deg optical hybrid circuit. The optical hybrid circuit, in turn, outputs further optical signals to four pairs of photodiodes or balanced photodetectors, which, in turn, generate corresponding electrical signals.

The electrical signals, which are typically in analog form, are next supplied to an analog-to-digital converter (ADC) circuit, which operates at a sampling rate to generate a series of digital samples at periodic time intervals. Each sample includes a plurality of bits. The samples may then be supplied to a digital signal processor (DSP), which processes the samples to extract the data carried by the optical signals.

The optical signals may be subject to various impairments including chromatic dispersion (CD), polarization mode dispersion (PMD), and cross-phase modulation (XPM). Such impairments, however, can be compensated or corrected with a known equalizer that may be implemented with the DSP. The equalizer may include a finite impulse response (FIR) that multiples the samples or portions thereof by different coefficients or weights (also known as tap weights) and then sums the resulting products. The FIR filter may have two outputs, each corresponding to the first and second polarizations of the transmitted optical signal.

One example of an optical signal modulation format that has been implemented in coherent systems is DP-QPSK (dual-polarized quaternary phase shift keying) transmitter. Here, light in each of two orthogonal polarizations of the transmitted optical signal carries two bits of information per symbol interval by phase modulation to four phase states separated by $\pi/2$ radians. In another exemplary modulation format, known as DP-BPSK (dual polarized binary phase shift keying) light in each of the two orthogonal polarizations carries one bit of information per symbol interval by phase modulating to two phase states separated by $\pi$ radians. While DP-BPSK carries only half the information as DP-QPSK, DP-BPSK modulation is preferred on optical fiber links whose transmission characteristics or impairments (e.g., CD, PMD, and XPM) are insufficient to support DP-QPSK.

As noted above, coherent receivers typically include an equalizer to process the received signals. The equalizer may include a finite impulse response (FIR) filter that multiples the samples or portions thereof by different coefficients or weights (also known as tap weights) and then sums the resulting products. To aid in setting tap weights of the FIR filter, known or predetermined symbols or data sequences may be carried by the optical signal output from the transmitter, and the filter coefficients may be set so that data output from the receiver matches the known data sequences.

If system parameters change, however, new tap weights need to be calculated, therefore requiring transmission of additional predetermined sequences, which consumes capacity that may otherwise be used to transmit user data.

Alternatively, alternatively, "blind equalization" techniques have been developed that can set the tap weights without transmission of predetermined data sequences. In systems that transmit DP-QPSK modulated optical signals, one blind equalization method is based on a so-called "Constant Modulus Algorithm" (CMA).

For DP-QPSK, a weakness of CMA is that some solutions to its tap weight calculation result in the data that was sent on one of the two polarizations at the transmitter appearing on both of the outputs of the FIR filter. This is termed a "degenerate state". One approach to avoid the degenerate state is described in a paper by Papadias et al. and is often referred to as Multi-User CMA (MU-CMA). However for DP-BPSK, MU-CMA does not ensure that the two outputs of the FIR filter are the un-corrupted data that was transmitted. Instead, each FIR filter output can be a linear combination of the signals transmitted on each polarization (and resembling QPSK). Accordingly, although MU-CMA is suitable for processing data carried by DP-QPSK modulated optical signal, MU-CMA may not be reliably used to process data carried by DP-BPSK modulated optical signals. Thus, the same processor running or programmed to carry out MU-CMA may not be used to process data carried by both DP-BPSK and DP-QPSK modulated optical signals.

Another solution would be to modify the characteristics of the transmitted signal to resemble DP-QPSK such that MU-CMA produces a satisfactory outcome, i.e., data carried by each polarization is correctly output, and to construct the receiver such that the tolerance to impairments is similar of the original DP-BPSK.

A potential candidate would be so-called "π/2-shifted BPSK". Here, the carrier phase is increased or decreased by π/2 radians from one symbol to the next according to the sign of an incoming data bit of each symbol. On any symbol carried by each polarization, the two possible transmitted phases or phase states are separated by pi radians; same as BPSK—as needed for impairment tolerance. Over time, the phase will be at one of four phase states; same as QPSK. Both polarizations alternate between the different phases relatively frequently in accordance with a repeating short bit sequence or coding pattern. It has been observed, however, that tap weight control remains unsatisfactory with MU-CMA even when BPSK modulated optical signals are transmitted in this manner.

SUMMARY

Consistent with an aspect of the present disclosure, an apparatus is provided that comprises an encoder circuit configured to receive a data bit, and output first and second drive signals in response to the data bit and a sequencing bit. The sequencing bit has one of a first value and a second value, and the sequencing bit is one of a plurality of sequencing bits supplied to the encoder circuit. A modulator circuit is also provided that is configured to provide a modulated optical signal in response to the first and second drive signals, such that the modulated optical signal has a variable phase. In addition, in response to the sequencing bit having the first value, the data bit is represented by a first change in the phase or an absence of a change in the phase during a predetermined time period. The first change in the phase is from a first phase state to a second phase state. Further, in response to the sequencing bit having the second value, the data bit is represented by a second change in the phase or a third change in the phase. The second change in the phase is from the first phase state to a third phase state, and the third change in the phase is a change from the first phase state to a fourth phase state.

Consistent with an additional aspect of the present disclosure, an apparatus is provided that includes an equalizer circuit and a demodulator circuit, which is configured to receive a modulated optical signal carrying a plurality of data bits and a local oscillator signal. The demodulator circuit supplies a plurality of demodulated outputs. First and second circuit blocks are also provided which are coupled to the equalizer circuit. The first circuit block provides a first output. The second circuit block includes a sequence generator circuit, a logic circuit, and a controller. The sequence generator supplies a first series of bits, and the logic supplies a second series of bits in response to the first output. The controller circuit is configured to adjust a timing of the first series of bits to substantially coincide with a timing of the second series of bits, such that the second circuit block supplies a second output including the plurality of data bits.

Consistent with a further aspect of the present disclosure, an optical transmitter is provided that is configured to selectively operate in one of first and second modes. The optical transmitter outputs a first modulated optical signal during the first mode and a second modulated optical signal during the second mode. The first modulated optical signal has an associated constellation in an I-Q plane, which includes first, second, third, and fourth phase states. The first and second phase states are along a first axis in the I-Q plane, and the third and fourth phase states are along a second axis in the I-Q plane. The optical transmitter receives data and includes a sequence generator circuit that supplies a sequencing bit.

In response to the sequencing bit having a first value during the first mode, the first modulated optical signal carries one of a first 1 bit and a second 0 bit indicative of the data, the first 1 bit being represented by a change in phase of the first modulated optical signal between the first and second phase states during a first predetermined time interval, and the 0 bit being represented by lack of change in the phase of the first modulated optical signal during the first predetermined time interval. In addition, in response to the sequencing bit having a second value during the first mode, the first modulated optical signal carries one of a third 1 bit and a fourth 0 bit indicative of the data, the third 1 bit and the fourth 0 bit being represented by a changes in phase of the first modulated optical signal between the third and fourth phase states during a predetermined second time interval. During the second mode, the second modulated optical signal carries symbols of the data represented by changes in the phase between the first, second, third, and fourth phase states, each of the symbols including a pair of bits which are indicative of the data. An optical receiver is also provided that is configured to receive the first modulated optical signal during the first mode of operation and the second modulated optical signal during the second mode of operation.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure.

BRIEF DESCRIPTION OF THE DRAWINGS

FIG. 4a illustrates a truth table associated with encoder circuit shown in FIG. 3;

DESCRIPTION OF THE EMBODIMENTS

Consistent with the present disclosure a transmitter is provided that transmits data in either a "quasi-DP-BPSK" ("QDP") mode or in a DP-QPSK mode. In the QDP mode, data bits are transmitted as changes in phase between first and second phase states along a first axis or as changes in phase between third and fourth phase states along a second axis in the IQ plane. Although the transmitter outputs an optical signal that changes in phase between each of the four states, a sequence bit identifies which axis carries the data bit. The sequence bit is one of a series of sequence bits that may be generated by a pseudo-random number generator. The series of sequence bits can be relatively long, e.g., 32 bits, to permit sufficiently random changes in the axis that carries the data. Thus, unlike conventional BPSK, in which data is transmitted between phase states along a single axis, the present disclosure provides an apparatus and related method for randomly selecting one of two axes, for example, for each transmitted bit.

In the receiver, it has been observed that the MU-CMA algorithm can process data carried by optical signals in the QDP mode with relatively few errors. Thus, the same equalizer (FIR) filter may be used to process BPSK, as well as QPSK data. In addition, the same series of sequence bits may be generated in the receiver and temporally aligned with the incoming signal so that the receiver can select the axis carrying the data in order to perform carrier recovery and decoding.

Since the same equalizer (FIR) filter may be used to process BPSK, as well as QPSK data, costs can be reduced because the same transmitter and receiver circuitry may be deployed for transmission over optical fiber links having characteristics that are unsuitable for DP-QPSK transmission as well as optical fiber links that can support DP-QPSK transmission.

Reference will now be made in detail to the present exemplary embodiments of the present disclosure, examples of which are illustrated in the accompanying drawings. Wherever possible, the same reference numbers will be used throughout the drawings to refer to the same or like parts.

Figure 1:
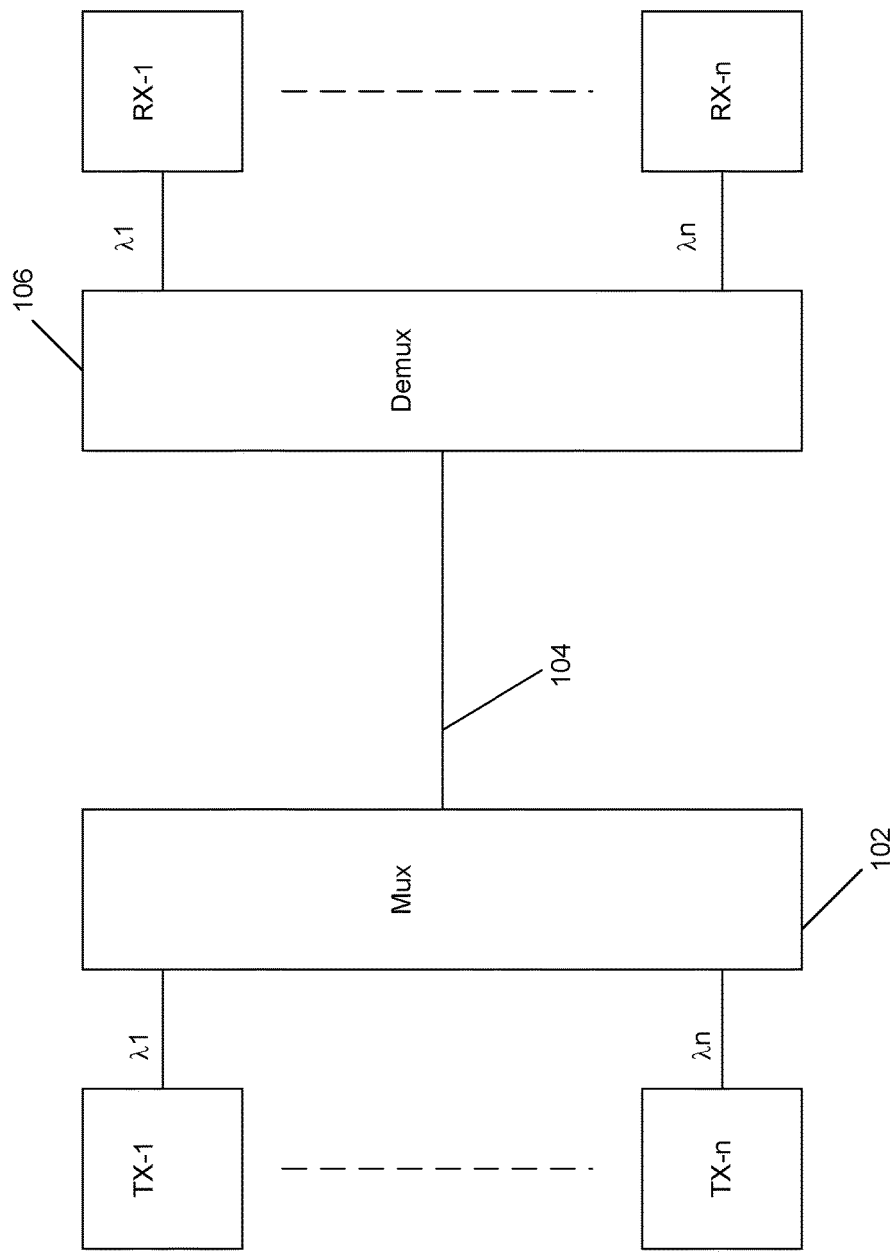
FIG. 1 illustrates an optical communication system consistent with an aspect of the present disclosure.

FIG. 1 illustrates an example of an optical communication system 100 consistent with an aspect of the present disclosure. Optical communication system 100 includes a plurality of transmitters TX-1 to TX-n, each of which receives a corresponding data bit stream and supplies a corresponding polarization multiplexed modulated optical signal having a respective one of a plurality of wavelengths λ1 to λn. Each of the optical signals may be provided to a multiplexer 102, for example, which combines the optical signals into a wavelength division multiplexed (WDM) optical signal that is transmitted on optical communication path 104 including one or more segments of optical fiber, for example. Optical communication path 104 may extend over several hundred or thousands of kilometers and the WDM optical signal may become excessively attenuated. Accordingly, one or more known optical amplifiers may be provided along optical communication path 104 to boost the power of the WDM optical signal.

After propagating along optical communication path 104, the WDM optical signal is provided to optical demultiplexer 106, which separates the modulated optical signals and supplies each to a corresponding one of optical receivers RX-1 to RX-n.

Figure 2:
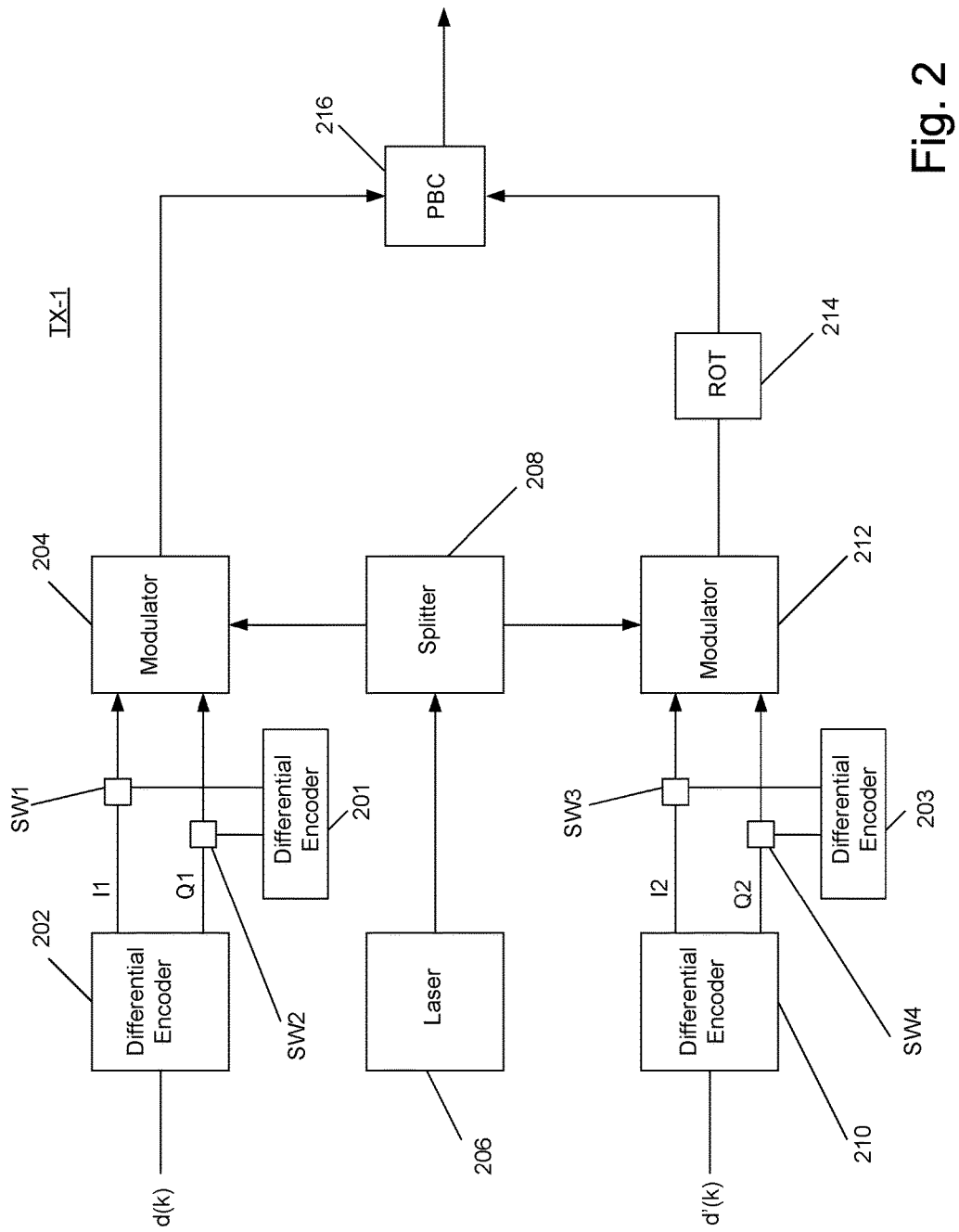
FIG. 2 is a block diagram illustrating components included in an optical transmitter consistent with an additional aspect of the present disclosure.

FIG. 2 illustrates one of optical transmitters TX-1 in greater detail. It is understood that remaining optical transmitters TX-1 to TX-n have the same or similar structure as optical transmitter TX-1. Optical transmitter TX-1 includes a first differential encoder or encoder circuit 202 that receives a series of data bits d(k) which may be grouped into symbols. Differential encoder 202, in turn, outputs in-phase (I(k−1)) and quadrature (Q(1-1)) data. In the "quasi-DP-BPSK" (QDP) mode, switch circuits or switches SW1 and SW2 are configured to supply I1 and Q1 data, respectively, as drive signals to modulator or modulator circuit 204.

In one example, laser 206 supply continuous wave (CW) light (or optical signal) to optical splitter 208, which supplies a first portion of the CW light to modulator 204 via port 208-1. Modulator 204, in turn, modulates the received CW light portion to provide a first modulated optical signal having a first polarization, for example, a transverse electric (TE) polarization.

As further shown in FIG. 2, optical transmitter TX-1 may also include a second differential encoder 210 that receives a series of data bits d'(k) which may also be grouped into symbols. Differential encoder 210, like differential encoder 202, outputs in-phase (I2) and quadrature (Q2) data. In the QDP mode, switches SW3 and SW4 are configured to supply I2 and Q2 data, respectively, as drive signals to modulator 212.

Splitter 208 has an additional port 208-2 to supply a second portion of the CW light (optical signal) to modulator 212, which modulates such light to provide a second modulated optical signal. Typically, laser 206, which may be a distributed feedback (DFB) laser outputs light having a TE polarization. Accordingly, the polarization of the second optical signal may be rotated by a known polarization rotator 214 to be transverse magnetic (TM). The first and second optical signals, modulated in accordance with the QDP modulation format, may then be combined with a polarization beam combiner (PBC) 216 and output to multiplexer 102. In the QDP mode of operation, differential encoders 201 and 203 may be deactivated.

In a second mode of operation, differential encoders 201 and 203 may be activated and differential encoders 202 and 210 may be deactivated. Differential encoders 201 and 203 may be conventional QPSK encoders that provide in-phase (I) and quadrature (Q) data. In the second mode of operation, switches SW1 and SW2 are configured to supply such data from differential encoder 201 to modulator 204, and switches corresponding QPSK drive signals. Switches SW3 and SW4 are similarly configured to supply I and Q data to modulator 212. Accordingly, in a manner similar to that described above, portions of light output from laser 206 are supplied from laser 208 and modulated by modulators 204 and 212 to provide modulated optical signals. Both of these optical signals, modulated in accordance with a conventional QPSK modulation format, but the polarization of the modulated optical signal supplied by modulator 212 is rotated by rotator 214, as noted above. The two modulated optical signals are then polarization multiplexed or combined by PBC 216, in a manner similar to that discussed above. Examples of modulators and polarization multiplexing are described in U.S. patent application Ser. No. 12/897,784, filed Oct. 5, 2010; Ser. No. 12/981,835, filed Dec. 30, 2010; Ser. No. 13/078,895, filed Apr. 4, 2011; Ser. No. 13/078,895, filed Apr. 4, 2011; Ser. No. 13/078,890 filed Apr. 4, 2011; and Ser. No. 13/078,888, filed Apr. 4, 2011. The contents of each of the US patent applications are incorporated herein by reference.

Remaining optical transmitters TX-2 to TX-n operate in a similar fashion to provide polarization multiplexed optical signals, modulated in accordance with either the QDP or QPSK modulation formats, for example, to multiplexer 102.

Figure 3:
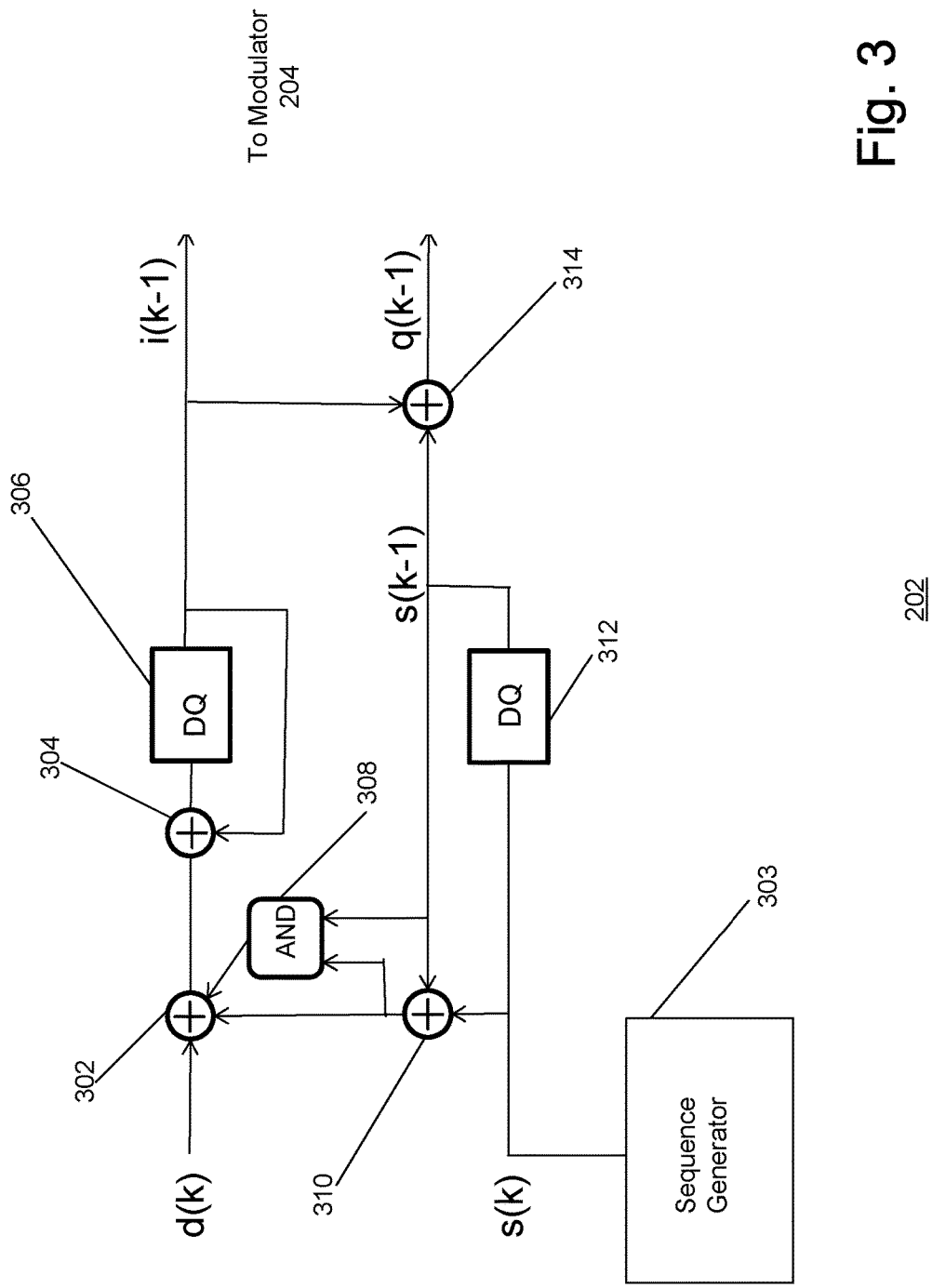
FIG. 3 illustrates an example of an encoder circuit consistent with a further aspect of the present disclosure.

FIG. 3 illustrates differential encoder 202 in greater detail. Differential encoder 202 may include a sequence generator 303 that outputs a series of sequencing bits (s(k)—where k is an integer and indicates a current sequencing bit, and k−1 indicates a previous sequencing bit). Each bit s(k) may be delayed by a delay circuit, including a known DQ flip-flop 312 to provide a delayed bit s(k−1), which is exclusive ORed (XORed) by XOR gate 310. The output of XOR gate is supplied as an input to AND gate 308 along with the s(k−1) bit. The output of AND gate 308 and XOR gate 310 are XORed with an incoming data bit d(k) by XOR gate 302, and the resulting output is fed to XOR gate 304. DQ flip-flop 306, for example, delays the output of XOR gate 304, and such delayed output is fed back to XOR gate 304. The output for DQ flip-flop 306 is output as in-phase data i(k−1), which is output to modulator 204. As further shown in FIG. 3, in-phase data i(k−1) is input to XOR gate 314 with the s(k−1) bit, and the resulting output from XOR gate, quadrature data q(k−1), is also supplied to modulator 204. Driver circuits (not shown) may be provided to supply appropriate analog signals corresponding to the i(k−1) and q(k−1) bits to modulator 204.

FIG. 4a illustrates truth table 400 associated with encoder circuit 202. In particular, for each sequencing bit s(k) and data bit d(k) supplied encoder circuit 202, bits s(k−1), i(k−1), i(k) and q(k−1) are shown. It is understood that the logic circuitry shown in FIG. 3 is exemplary only and that other logic implementations may be employed that yield the same outputs as that shown in truth table 400.

Figures 4B, 4C, 4D:
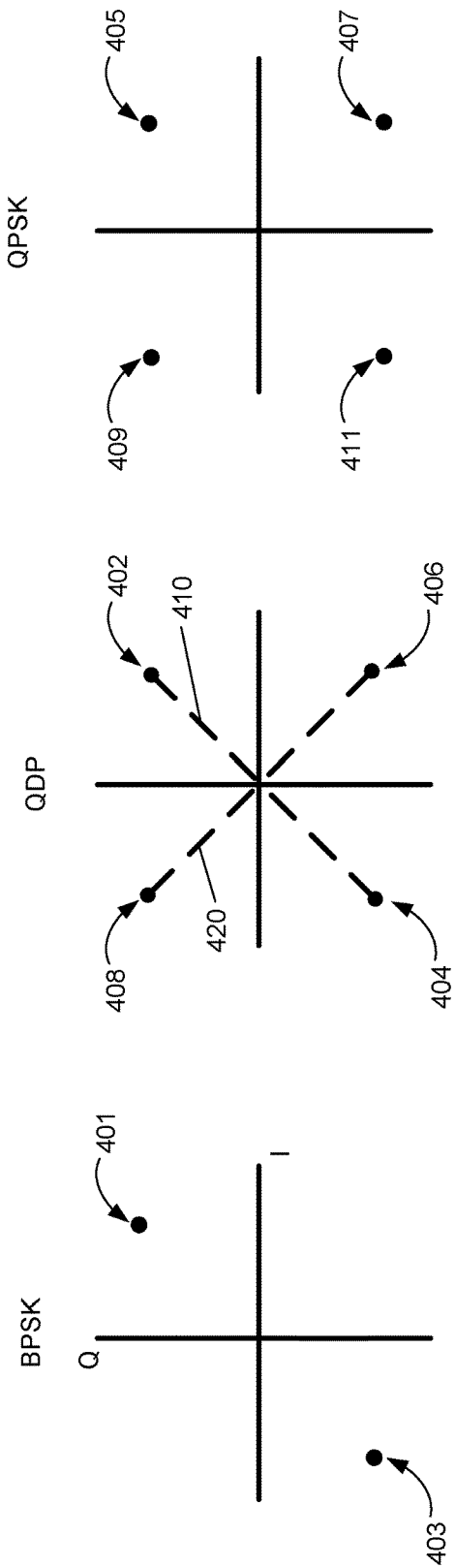
FIGS. 4b-4d illustrate examples of phase constellations.

With reference to FIGS. 4b-4d, FIG. 4b illustrates a phase constellation associated with convention BPSK modulation. Here, transmitted data is represented by phase transitions of the transmitted optical signal between phase states 401 and 403, which are at 180 degrees relative to each other. As discussed above, MU-CMA typically cannot adequately be used to optimize tap weights in an equalizer that processes such data carried by BPSK modulated optical signal.

FIG. 4d illustrates a phase constellation associated with a QPSK modulated optical signal. In this example, data is transmitted in groups or symbols of two bits each, and each pair of bits is represented by transitions between phase states 405, 407, 409, and 411. As noted previously, MU-CMA may be used to process data carried by QPSK modulated optical signals.

Consistent with the present disclosure, however, BPSK data bits may be represented by transitions between phase states along pseudo-randomly alternating axes in the QDP mode. Sequence generator 303 may generate each sequencing bit s(k) in accordance with a repeating pseudo-random sequence, which may be 32 bits long, and such sequencing bits designate which axis carries the data bit. For example, with reference to FIG. 4c, when the s(k) bit has a value of '1', axis 410 in the IQ plane may be selected, such that the transmitted data bit is represented by phase transitions or changes in phase of the modulated optical signal between phase states 402 and 404, which are along axis 410. If the s(k) bit has a value of '0', however, axis 420 in the IQ plane may be selected, such that the transmitted data bit is represented by phase transitions between phase states 406 and 408.

Thus, the value of the s(k) is randomly selected, such that for data bits are randomly assigned to either axis 410 or axis 420. The following rules may apply for coding data bits for transmission. If a new symbol x(k) is to be sent on the same axis (either axis 410 or 420) as a previous symbol x(k−1), conventional differential coding applies, namely:

$d(k)=1 \rightarrow 3x(k)=-x(k-1)$ $d(k)=0 \rightarrow 3x(k)=+x(k-1)$

In addition, if the new symbol is to be sent on an axis different than the previous symbol, minimum shift keying (MSK)-like differential encoding applies (data determines sign of phase change):

$d(k)=1 \rightarrow 3x(k)=-j*x(k-1)$ $d(k)=0 \rightarrow 3x(k)=+j*x(k-1)$

These coding rules permit differential decoding in the receiver with both QPSK and BPSK logic.

Returning to FIGS. 4c and 4d, the phase constellation associated with QDP modulation resembles that of QPSK modulation. Accordingly, QDP modulated optical signals may carry BPSK data, but may appear as conventional QPSK modulated optical signals. For example, in the QDP mode, pairs of bits or symbols are represented, over time, as transitions between four phase states, as in QPSK. In QDP, however, preferably only one bit of the pair constitutes a data bit, while the other bit may be considered a "dummy bit" which is not selected. Thus, the data carried by QDP modulated optical signals may be processed in accordance with MU-CMA with few errors. Moreover, at the receive end, the same equalizer, in which the tap weights are optimized or selected with MU-CMA, may be used to process BPSK data carried by QDP modulated optical signals, as well as data carried by QPSK modulated optical signals. Processing of the received optical signals will next be described with reference to FIG. 5.

Figure 5:
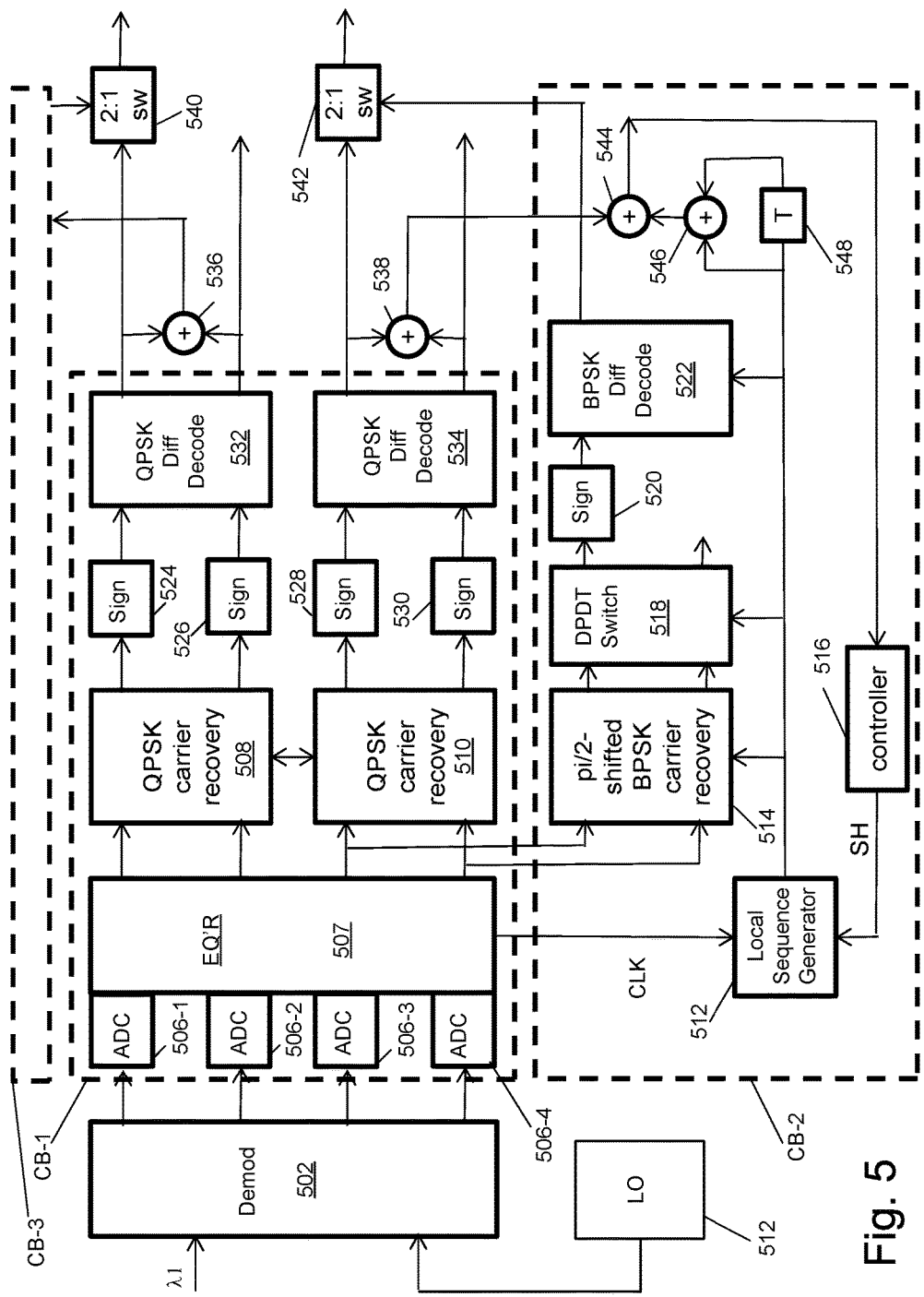
FIG. 5 illustrate components of an optical receiver consistent with an additional aspect of the present disclosure.

As noted above, polarization multiplexed optical signals having wavelengths λ1 to λn are output from optical transmitters TX-1 to TX-n and combined into a WDM optical signal, which is fed to optical demultiplexer 106. Optical demultiplexer 106, in turn, separates and supplies each of optical signal to a corresponding one of optical receivers RX-1 to RX-n. FIG. 5 illustrates a block diagram of an optical receiver RX-1 (see FIG. 1) consistent with an additional aspect of the present disclosure. It is understood that remaining optical receivers RX-2 to RX-n have the same or similar structure as optical receiver RX-1.

Optical receiver RX-1 may include an optical demodulator circuit 502 that receives one of the polarization multiplexed optical signals having wavelength λ1, for example. In addition, optical demodulator circuit 502 may receive an light or an optical signal from a laser 504, which may also serve as a local oscillator (LO). As generally understood, the wavelength of the light output from laser 504 may be sufficiently close to the wavelength λ1 so as to generate a "beat" signal. Optical demodulator 502 may include an optical hybrid circuit, which supplies optical signals based on the light output from laser 504 and the incoming optical signal. Optical demodulator circuit 502 may also include photodiodes, arranged as balanced detectors, for example, to sense or convert the optical signals output from the optical hybrid circuit into electrical signals. Also, transimpedance amplifiers (TIAs) and automatic gain control circuitry may also be provided in demodulator 502. Such circuitry is further described in the above noted patent applications.

Demodulator circuit 502 is coupled to circuit block CB1, which includes conventional circuitry for equalizing, performing carrier recover, and differential decoding QPSK modulated optical signals. Circuit block CB1 may include analog to digital conversion (ADC) circuits 506-1 to 506-4. Demodulator circuit 502 may output electrical signal in analog form, which are then converted into corresponding digital signals or samples by ADC circuits 506-1 to 506-4. The outputs of ADC circuits 506-1 to 506-4 are fed to a conventional equalizer circuit 507, whereby tap weights are optimized or updated in accordance with MU-CMA, as discussed above. Equalizer circuit 507 is configured to process QPSK data carried by QPSK modulated optical signals, as well as QDP modulated optical signals noted above.

As further shown in FIG. 5, outputs from equalizer 507 supplied to a conventional QPSK carrier recovery circuit 508 may be associated with data bits carried by a TE polarization component of the incoming optical signals, and outputs from equalizer 507 supplied to a conventional QPSK carrier recovery circuit 510 may be associated with data bits carried by a TM polarization component of the incoming optical signal. I and Q components of the TE component are respectively supplied to circuits 524 and 526 from carrier recovery circuit 508. Circuits 524 and 526 determine the sign of the output from carrier recovery circuit 508. The result is a 2 bit representation indicating which of the 4 phases of the carrier was sent but with a 4-fold phase ambiguity (0, 90, 180 or 270 degrees added; unknown which.) Differential decoder 534, discussed below, measures the phase change from one symbol to the next and recovers the transmitted data. In a similar fashion, QPSK carrier recovery circuit 510 receives outputs from equalizer circuit 507 associated with the TM component. Circuits 528, 530, and QPSK differential decoder circuit 534 are known and operate in a similar fashion as circuits 524m, 526, and 532 to provide I and Q data.

In a QPSK mode, switch circuits or switches 540 and 542 (as well as additional switches which are not shown for convenience) are configured to output the I, Q data from decoder circuits 532 and 534 for further processing.

In order to insure proper operation during the QDP mode, however, circuitry in optical receiver RX-1 is preferably synchronized with the incoming signal so that the axis carrying the data bit can be identified, and the corresponding data bit can be output. As discussed in greater detail below, the same series of sequencing bits is generated in the receiver and is temporally aligned with data carried by the received optical signal. At which point, the sequencing bits identify which axis carries data (as in the encoder circuits discussed above), so that such data can be processed further by carrier recovery and decoding circuitry, for example.

Returning to FIG. 5, equalizer 507 outputs a clock signal CLK to local to sequence generator circuit 512 in circuit block CB2. Sequence generator circuit 512 preferably supplies the same pseudo-randomly generated series of sequencing bits s(k) as sequence generator 303 discussed above. The timing of the s(k) bits is partially adjusted based on clock CLK, but clock CLK alone, by itself, may not be sufficient to align the s(k) bits with the received data carried by optical signal in the QDP mode.

Accordingly, in one example, s(k) bits output from sequence generator 512 are supplied to delay circuit 548, the output of which supplies a delayed bit s(k−1) to XOR gate 546, which also receive a non-delayed bit, s(k). Thus, XOR gate 546 exclusively ORs two successive sequencing bits. If such successive bits are the same (either both are 0s or both are 1s), XOR gate 546 outputs a 0 bit, which indicates that both bits designate the same axis (either 410 or 420 in FIG. 4c). Thus, the 0 bit output from XOR gate 546 indicates no change in the data bit carrying axis is indicated. On the other hand, if the successive s(k) bits differ (one is a 0 and the other is a 1), XOR gate 546 outputs a 1 bit, which indicates that a change in the data bit carry axis has occurred.

As further shown in FIG. 5, the output of XOR gate 546 is fed to a comparison circuit, such as XOR gate 544. XOR gate 544 also receives an output of a logic circuit, such as, XOR gate 538. XOR gate 538 exclusively ORs the I and Q bit outputs from decoder circuit 534. As discussed below with reference to FIG. 6, the output of XOR gate 538 indicates changes in the data carrying axis associated with the optical signal received by optical receiver RX-1.

Figure 6:
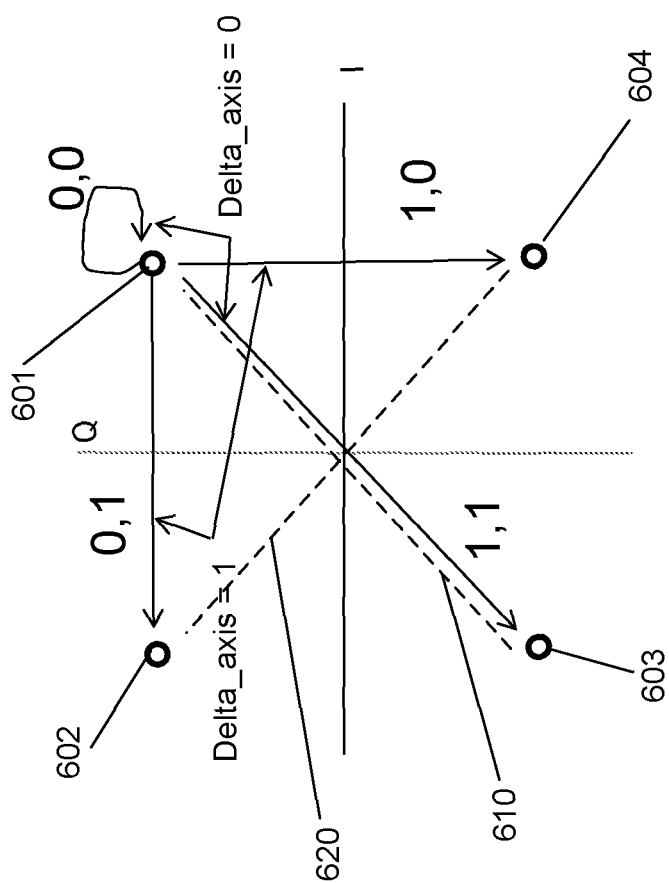
FIG. 6 illustrates phase transitions between phase states on an I-Q plane consistent with a further aspect of the present disclosure.

FIG. 6 illustrates an IQ plane 600, having a constellation including phase states 601 to 604. As generally understood, during QPSK modulation, data bits are represented by changes in phase of the optical signal between these phase states. For example, a change in phase between phase states 601 and 603 corresponds to transmission of a symbol including I,Q bits 1,1. In addition, no change in the phase during a given symbol period (predetermined period), e.g., the phase remains at state 601, represents a symbol including I,Q bits 0,0. As shown in FIG. 6, phase states 601 and 603 lie on the same axis, e.g., axis 610. Thus, QPSK symbols including 0,0 bits and 1,1 indicate that no change in the data carrying axis has occurred because either the lack of change in phase, indicated by a 0,0 symbol, or a phase change that represents a 1,1 both occur on the same axis. The XOR of such I and Q bits is 0 (0 XOR 0=0 and 1 XOR 1=0).

As shown in FIG. 5, the I and Q bits output from decoder circuit 534 are exclusively ORed by gate 538. Accordingly, when XOR gate 538 outputs a 0 bit, the I and Q inputs to gate 538 are either 0,0 or 1,1, and in both instances no change in axis has occurred (Delta_axis=0).

On the other hand, in accordance with QPSK modulation, a change in the phase of the optical signal from phase state 601 to 602, for example, represents a symbol including I,Q bits 0,1, and a change in phase from phase state 601 to 604, for example, represents a symbol including I,Q bits 1,0. Phase states 603 and 604 lie along axis 620, and thus, the axis carrying the data bits has changed from axis 610 to axis 620. When I,Q bits 0,1 and 1,0 are supplied to XOR gate 538 from decoder circuit 534, XOR gate 538 outputs a 1 bit. Thus, this 1 bit indicates a change in the axis carrying the data bit (Delta_axis=1).

Over time, XOR gate 538 supplies a series of bits to XOR gate 544, which indicate either a change or no change in the data bit carrying axis. As noted above, XOR gate 544 also receives an output from XOR gate 546, which effectively compares two successive sequencing s(k) bits provided by sequence generator 512. When the outputs of XOR gate 538 match or are the same as the output from XOR gate 546, the series of sequencing bits s(k) bits tracks the axis changes in the received optical signal. Such tracking or synchronization may be indicated by a 0 bit output from XOR gate 544. As a result, data bits can be processed from the correct axis, as discussed in greater detail below. If the outputs of XOR gates 538 and 546 differ, however, the s(k) bits output from sequence generator 512 are not temporally aligned with the axis changes of the received optical signal, and XOR gate 544 supplies a 1 bit to controller circuit 516. Controller circuit 512, in turn, supplies a control signal SH to sequence generator 512 to further adjust the timing the series of sequencing bits s(k) until bits s(k) coincide with the series of bits output from XOR 538, at which s(k) is synchronized with the axis changes, as noted above. Other synchronizing circuits and techniques may be used as well.

As further shown in FIG. 5, equalizer 507 supplies I and Q data to π/2 shifted BPSK carrier recovery circuit 514, which in accordance with the s(k) bits supplies outputs to double-pole-double-throw switch circuit 518. Further based on the s(k) bits, switch 518 selects either I or Q data as the data bit, and the selected data is provided to circuit 520 which determines the sign of the output of switch 518_. Circuit 520, in turn, provides an output to BPSK decoder circuit 522, which supplies data bits to switch 542. During the QDP mode, switch circuit 541 is configured to output such data, instead of data from decoder circuit 534.

Operation of circuits 514, 518, and 572 will next be described in greater detail with reference to FIGS. 7 and 8.

Figure 7:
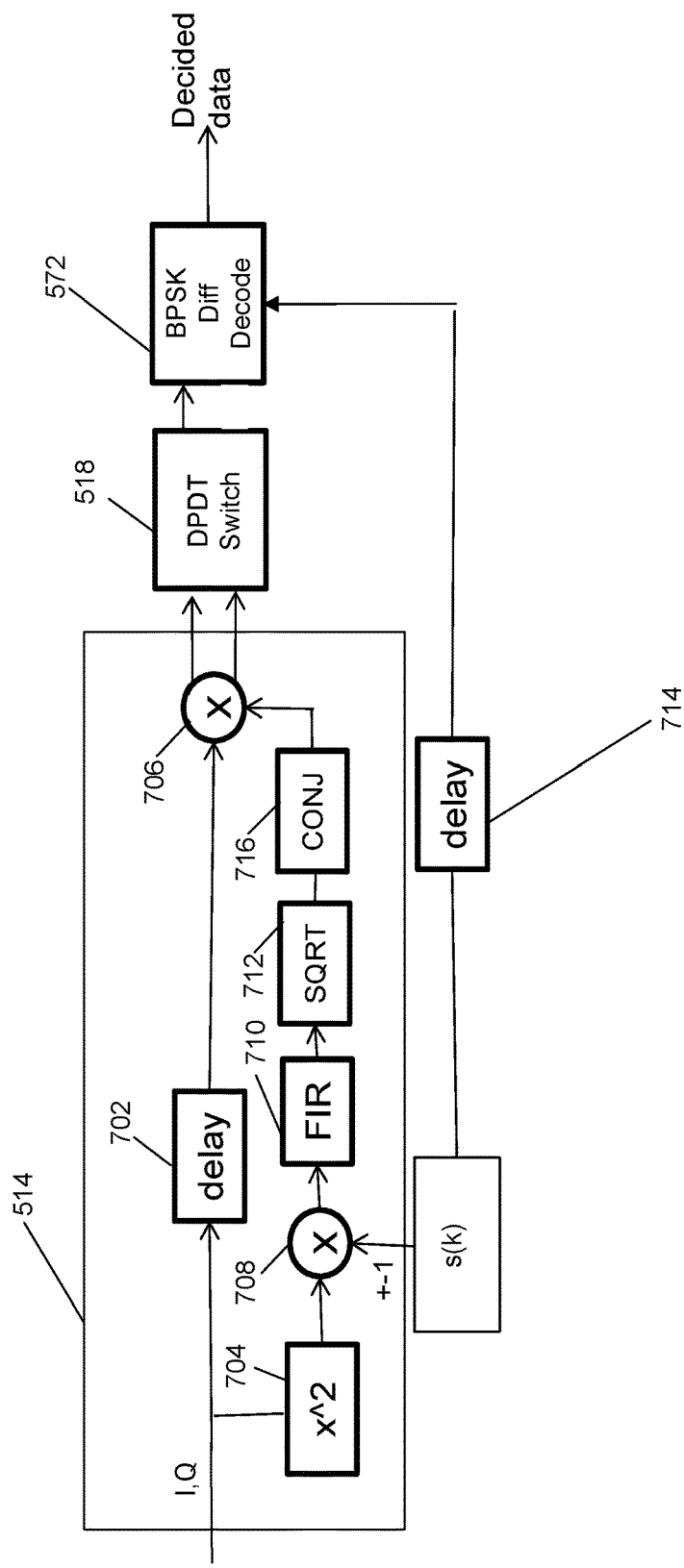
FIG. 7 illustrates a block diagram of a carrier recovery circuitry shown in FIG. 5 in greater detail.
Figure 8:
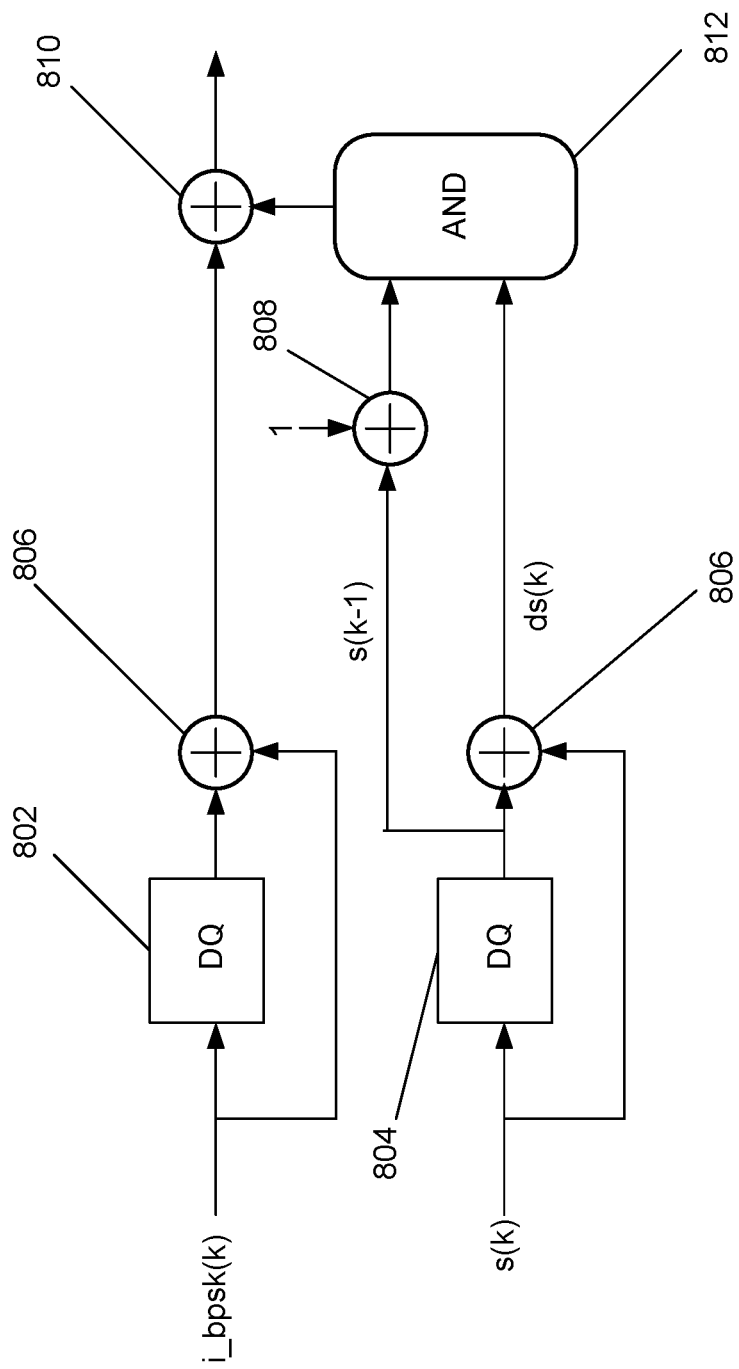
FIG. 8 illustrates a decoder circuit consistent with a further aspect of the present disclosure.

FIG. 7 illustrates carrier recovery circuit 514 in greater detail. Carrier recovery circuit 514 includes a squaring circuit 704 that performs complex squaring of the I,Q data received from equalizer 507. Carrier recovery circuit 514 also includes a delay circuit 702, finite impulse response filter circuit 710, square root circuit 712, complex conjugate circuit 716, and multiplier 706. Each of these circuits are known components of a conventional BPSK carrier recovery loop. Carrier recovery circuit 514 differs from a conventional carrier recovery loop by inclusion of multiplier 708 and application of sequencing bits s(k), which are employed to account for the presence of data on both axis. Namely, if, for example, the data bit is present on an axis associated with the I-axis of an IQ plan, and such data is present on the plus side of the axis or the negative side of the axis, the s(k) bit is equal to 1 and XOR gate effectively passes the output of squaring circuit 704 to FIR filter circuit 710, and carrier recovery circuit 514 operates in a known manner to recover the carrier. On the other hand, if the data is present on an axis associated with the Q-axis, squaring effectively rotates such data to the negative I-axis. Accordingly, the s(k) bit, which is at 0 (effectively a −1) negates the output of squaring circuit 704, so that the squared data is flipped to the positive I-axis where it can be appropriately processed by carrier recovery circuit 514 in a known manner.

As further shown in FIG. 7, one of the I Q output from carrier recovery circuit 514 is selected by switch 518 and supplied via circuit 520 (not shown in FIG. 7) to decoder circuit 522. The series of sequencing bits s(k) may be delayed by circuit 714 to account for delays associated with carrier recovery circuit 514 and switch 518 so that decoder circuit 522 receives s(k) with appropriate timing.

Decoder circuit 522 will next be described with reference to FIG. 8. FIG. 8 includes a delay circuit including a DQ flip flop 802 that receives a bit output from circuit 520, here designated as i_bpsk(k). A delayed version of i_bpsk(k), i_bpsk(k−1), is output from flip-flop 802 and supplied to XOR gate 806, which also receives the i_bpsk(k) bit. A sequencing bit s(k) is supplied to delay circuit including DQ flip flop 804, for example, which delays the s(k) bit to provide s(k−1). XOR gate 806 receives s(k) as well as s(k−1) and supplies an input to AND gate 812. The output of flip-flop 804 (s(k−1)) is negated by XOR gate 808 and then input to AND gate 812. The output of AND gate 812 is fed to XOR gate 810, which also receives the output from XOR gate 806. The output of XOR constitutes the original data bit d(k) supplied to encoder 202. As noted above, switch circuit 542 receives and outputs data bits d(k) during the QDP mode of operation.

Decoder 572 effectively performs the inverse operations of those carried out in encoder to 202 to output data bits d(k).

As noted above, d(k) is associated with one of the polarization components (TM) of the received optical signal. In a similar fashion, circuit block CB-3 (see FIG. 5) includes circuitry similar to or the same as that included in circuit block CB-2 to output data d'(k) (see FIG. 2) associated with the other polarization component (TE) based on outputs from equalizer 507. For example, the I Q outputs from decoder circuit 532 are XORed by logic circuit or gate 536 for synchronization of a series of sequencing bits in a manner similar to that described above in connection with XOR gate 538. The series of sequencing bits associated with circuit block CB-3, however, may be different than or the same, but offset, from the series of sequencing bits associated with circuit block CB-2. Alternatively, the sequencing bits of circuit block CB-2 may be the same and have the same timing as the sequencing bits of circuit block CB-3. Switch circuit 540, like switch 542, is configured to output d'(k) during the QDP mode of operation.

Thus, in sum, an optical communication system is disclosed that transmits in one of two modes. In the first mode, QDP, BPSK data is carried by randomly selected axes, and thus resembles QPSK in this respect. Such BPSK data can then advantageously be processed with the same equalizer and MU-CMA algorithm.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising
   a first encoder circuit configured to receive a data bit, and output first and second drive signals in response to the data bit and a sequencing bit, the sequencing bit having one of a first value and a second value, and the sequencing bit being one of a plurality of sequencing bits supplied to the encoder circuit;
   a modulator circuit configured to provide a modulated optical signal in response to the first and second drive signals, such that the modulated optical signal has a variable phase;
   a second encoder circuit configured to supply third and fourth drive signals to the modulator circuit;
   switch circuitry configured to selectively supply the first and second drive signals or the third and fourth drive signals to the modulator circuit, the first drive signal carrying first in-phase data and the second drive signal carrying first quadrature data, the third drive signal carrying second in-phase data and the fourth drive signal carrying second quadrature data, such that when the third and fourth drive signals are supplied to the modulator circuit, the modulated optical signal has quadrature phase shift keying (QPSK) modulation and in response to the first and second drive signals the modulated optical signals has quasi-binary phase shift keying (QDP) modulation; and
   a polarization rotator that rotates a polarization of the modulated optical signal;
   wherein, in response to the sequencing bit having the first value and in accordance with the QDP modulation, the data bit is represented by a first change in the phase or an absence of a change in the phase during a predetermined time period, the first change in the phase being from a first phase state to a second phase state only along a first axis of an in-phase quadrature (IQ) plane, and
   in response to the sequencing bit having the second value and in accordance with the QDP modulation, the data bit is represented by a second change in the phase or a third change in the phase, the second change in the phase being from the first phase state to a third phase state, and the third change in the phase being a change from the first phase state to a fourth phase state only along a second axis of the IQ plane.

2. An apparatus in accordance with claim 1, further including a circuit to supply the plurality of sequencing bits, the plurality of sequencing bits conforming to a pseudo-random sequence.

3. An apparatus in accordance with claim 1, further including a laser that supplies light to the modulator circuit, the modulator circuit modulating the light to supply the modulated optical signal.

4. An apparatus in accordance with claim 1, wherein the modulated optical signal is modulated in accordance with a quadrate phase shift keying (QPSK) modulation format.

5. An apparatus, comprising:
an encoder circuit configured to receive a data bit, and output first and second drive signals in response to the data bit and a sequencing bit, the sequencing bit having one of a first value and a second value, and the sequencing bit being one of a plurality of sequencing bits supplied to the encoder circuit;
a modulator circuit configured to provide a modulated optical signal in response to the first and second drive signals, such that the modulated optical signal has a variable phase,
wherein, in response to the sequencing bit having the first value, the data bit is represented by a first change in the phase or an absence of a change in the phase during a predetermined time period, the first change in the phase being from a first phase state to a second phase state, and
in response to the sequencing bit having the second value, the data bit is represented by a second change in the phase or a third change in the phase, the second change in the phase being from the first phase state to a third phase state, and the third change in the phase being a change from the first phase state to a fourth phase state, the apparatus further including an Exclusive OR (XOR) circuit that receives the sequencing bit and the data bit, the encoder circuit supplying the first drive signal in accordance with the data bit and the second drive signal in accordance with an output of the XOR circuit.

6. An apparatus in accordance with claim 5, wherein the modulated optical signal has in-phase and quadrature components, the in-phase component of the modulated optical signal is output from the modulator circuit in response to the first drive signal and the quadrature component of the modulated optical signal is output from the modulator circuit in response to the second drive signal.

7. An apparatus comprising:
an optical transmitter configured to selectively operate in one of first and second modes, the optical transmitter outputs a first modulated optical signal during the first mode and a second modulated optical signal during the second mode, the first modulated optical signal has an associated constellation in an I-Q plane, the constellation including first, second, third, and fourth phase states, the first and second phase states being along a first axis in the I-Q plane, and the third and fourth phase states being along a second axis in the I-Q plane, the optical transmitter receiving data,
the optical transmitter including:
a modulator circuit that supplies the first modulated optical signal during the first mode and the second modulated optical signal during the second mode,
a first encoder circuit that supplies first and second drive signals during the first mode,
a second encoder circuit that supplies third and fourth drive signals during the second mode,
switch circuitry configured to selectively supply the first and second drive signals or the third and fourth drive signals to the modulator circuit, the first drive signal carrying first in-phase data and the second drive signal carrying first quadrature data, the third drive signal carrying second in-phase data and the fourth drive signal carrying second quadrature data, such that when the third and fourth drive signals are supplied to the modulator, in response to the first and second drive signals the first modulated optical signals has quasi-binary phase shift keying (QDP) modulation in the first mode and the second modulated optical signal has quadrature phase shift keying (QPSK) modulation in the second mode,
a polarization rotator that rotates a polarization of the modulated optical signal,
a sequence generator circuit that supplies a sequencing bit,
wherein, in response to the sequencing bit having a first value during the first mode, the first modulated optical signal carries one of a first 1 bit and a second 0 bit indicative of the data, the first 1 bit being represented by a change in phase of the first modulated optical signal between the first and second phase states during a first predetermined time interval, and the 0 bit being represented by lack of change in the phase of the first modulated optical signal during the first predetermined time interval,
in response to the sequencing bit having a second value during the first mode, the first modulated optical signal carries one of a third 1 bit and a fourth 0 bit indicative of the data, the third 1 bit and the fourth 0 bit being represented by a changes in phase of the first modulated optical signal between the third and fourth phase states during a second predetermined time interval,
during the second mode, the second modulated optical signal carries symbols of the data represented by changes in the phase between the first, second, third, and fourth phase states, each of the symbols including a pair of bits which are indicative of the data; and
an optical receiver configured to receive the first modulated optical signal during the first mode of operation and the second modulated optical signal during the second mode of operation.

8. An apparatus comprising:
an optical transmitter configured to selectively operate in one of first and second modes, the optical transmitter outputs a first modulated optical signal during the first mode and a second modulated optical signal during the second mode, the first modulated optical signal has an associated constellation in an I-Q plane, the constellation including first, second, third, and fourth phase states, the first and second phase states being along a first axis in the I-Q plane, and the third and fourth phase states being along a second axis in the I-Q plane, the optical transmitter receiving data,
the optical transmitter including:
a sequence generator circuit that supplies a sequencing bit,
wherein, in response to the sequencing bit having a first value during the first mode, the first modulated optical signal carries one of a first 1 bit and a second 0 bit indicative of the data, the first 1 bit being represented by a change in phase of the first modulated optical signal between the first and second phase states during a first predetermined time interval, and the 0 bit being represented by lack of change in the phase of the first modulated optical signal during the first predetermined time interval,
in response to the sequencing bit having a second value during the first mode, the first modulated optical signal carries one of a third 1 bit and a fourth 0 bit indicative of the data, the third 1 bit and the fourth 0 bit being represented by a changes in phase of the first modulated optical signal between the third and fourth phase states during a second predetermined time interval, during the second mode, the second modulated optical signal carries symbols of the data represented by changes in the phase between the first, second, third, and fourth phase states, each of the symbols including a pair of bits which are indicative of the data, and an Exclusive OR (XOR) circuit that receives the sequencing bit and the data, the encoder circuit supplying first drive signal in accordance with the data and the second drive signal in accordance with an output of the XOR circuit; and an optical receiver configured to receive the first modulated optical signal during the first mode of operation and the second modulated optical signal during the second mode of operation.

* * * * *